United States Patent [19]

Kenyon

[11] 4,400,764

[45] Aug. 23, 1983

[54] LOW BACKSCATTER ILLUMINATION SYSTEM

[75] Inventor: Bruce A. Kenyon, Sumner, Wash.

[73] Assignee: The Boeing Company, Seattle, Wash.

[21] Appl. No.: 265,097

[22] Filed: May 19, 1981

Related U.S. Application Data

[63] Continuation-in-part of Ser. No. 118,662, Feb. 5, 1980, abandoned.

[51] Int. Cl.³ .............................................. F21V 9/00
[52] U.S. Cl. ................................. 362/263; 362/61; 362/268; 362/293; 362/297; 362/302; 362/305; 350/171; 350/174
[58] Field of Search ................. 362/35, 61, 261, 268, 362/263, 293, 297, 302, 305; 350/171, 174

[56] References Cited

U.S. PATENT DOCUMENTS

| | | | |
|---|---|---|---|
| 2,202,278 | 5/1940 | White | 362/268 |
| 2,215,203 | 9/1940 | Young | 362/268 |
| 2,241,128 | 5/1941 | Harley | 362/268 |
| 2,503,500 | 4/1950 | Lowry | 362/268 |
| 3,457,401 | 7/1969 | Hoekstra | 362/268 |
| 4,192,578 | 3/1980 | Suzuki | 350/171 |
| 4,206,494 | 6/1980 | Lovering | 362/268 |
| 4,367,519 | 1/1983 | Houghton | 362/268 |

*Primary Examiner*—Donald P. Walsh
*Attorney, Agent, or Firm*—Hughes, Barnard & Cassidy

[57] ABSTRACT

Methods and apparatus are disclosed for shaping illuminating beams from continuous duty searchlights or the like so as to minimize the effect of backscattered illumination and, to thereby increase the brightness contrast between illuminated target objects and background so as to improve visibility. More specifically, a continuous duty illumination system comprising an optical system in which the distribution of the light beam entering the entrance pupil of the optical system comprises a collimated beam of high radiant intensity which is thereafter split along an axis bisecting the distributional pattern, or image, with light from the respective halves of the distribution image being directed first in opposite directions and then being redirected in substantially parallel directions; and, wherein light from each half of the split distribution is imaged into respective ones of a pair of collimating lenses with each lens receiving light only from the upper half of its focal plane so that the parallel beams leaving the exit pupils of the optical system contain light only in the space below a generally horizontal plane passing through and containing the optical axes of the system.

39 Claims, 27 Drawing Figures

LOW BACKSCATTER ILLUMINATION SYSTEM

RELATED APPLICATION

This application is a continuation-in-part application based, in part, on applicant's co-pending application Ser. No 118,662, filed Feb. 5, 1980, for "Low Backscatter Illumination System," now abandoned.

BACKGROUND OF THE INVENTION

The present invention relates generally to an improved optical system for shaping illuminating beams from continuous duty searchlights or the like so as to minimize the effect of backscattered illumination and, thereby enhance the brightness contrast between illuminated target objects and background so as to improve visibility; and, more particularly, to methods and apparatus comprising an optical system of the type employing a continuous duty searchlights wherein the distribution of the light beam emanating from the aperture of a lamp—i.e., the entrance pupil of the optical system—comprises a collimated beam of high radiant intensity and, wherein provision is made for splitting such collimated beam along a line bisecting the distributional pattern of light, with respective halves of the distribution being first directed in opposite directions and then being redirected in substantially parallel directions and, wherein the light from each half of the split distribution is imaged into respective ones of a pair of collimating lenses with each lens receiving light only from the upper half of its focal plane so that the parallel beams leaving the exit pupils of the optical system contain light only in the space below a generally horizontal plane passing through and containing the optical axes of the system.

Various types of situations exist where visibility under adverse meterologic conditions is critical. A typical, but non-limiting, example of such a situation is that involving movement of marine vessels over heavily trafficked waterways such as a harbor, a harbor entrance, and the like. Often such marine activities must be carried out at night and under weather conditions where fog or the like is prevalent. Such vessels commonly employ continuous duty searchlights to illuminate the path along which the vessel is to pass, with the illuminated path being continuously monitored by, for example, low light level television cameras or, in some instances, simply by individuals functioning as "lookouts". In either case, the ability to discriminate between target objects and background in the path of vessel movement can be, and is, seriously degraded by backscattered illumination which serves to decrease and, in many cases, to virtually eliminate the brightness contrast between illuminated target objects and background, thus making it virtually impossible to detect objects in the path of movement in time to permit suitable evasive action.

The problem typically encountered is one with which most operators of motor vehicles are familiar. Thus, it can be analogized to driving an automobile at night under foggy conditions where the operator's eye level is located only a few feet above the level of the headlights. When the headlights are switched from "low beam" to "high beam", visibility is seriously impaired due to backscattered illumination from the miniscule droplets of moisture in the air. If, on the other hand, it were possible to locate the driver directly above the portion of the road being illuminated so that he could view the illuminated area without having to look along the beam from the headlights, backscattered light would pose no significant problem. It is for this reason that operators of tractor-trailers and the like enjoy better visibility under foggy conditions than do drivers of automobiles—viz., the truck drivers are generally located in the relatively high cab of their vehicles at an eye level which is on the order of up to six to eight feet above the level of the truck headlights. However, even under these conditions backscattered illumination still poses a problem; this despite the fact that the area illuminated by vehicular headlights extends for only a few hundred feet ahead of the vehicle. It will, of course, be understood by those skilled in the art that as the range of the illuminated area is increased, the included angle between the line of sight from the observer and the axis of the illuminating beam is decreased, thereby inherently requiring the observer to look along the illuminated path even though he may be several feet above the path.

Considering marine vessels where maneuverability is much more restricted than with motor vehicles it is necessary to illuminate an area extending many hundreds of feet—indeed, in many instances, an area extending up to, and even in excess of, a mile—in front of the vessel and, consequently, even when it is possible to locate a monitoring instrument such as a low light level television camera (or a human eye) ten, fifteen, or twenty feet, or more, above the light source, the monitoring instrument is still required to look along the path of illumination, particularly as the range increases. This produces serious visibility problems for the reasons desscribed above when using conventional continuous duty searchlights.

It should be understood that while the invention finds particularly advantageous use in connection with minimizing illumination backscatter on marine vessels such, for example, as relatively high-speed hydrofoil vessels or the like, and is therefore herein described in such an environment, it is not necessarily restricted to marine applications; but, rather, the invention may find use in other areas where backscattered illumination presents a problem and the particular economics involved permit the use of the invention to improve visibility. That is, the present invention would, if economically feasible, improve visibility for operators of motor vehicles; but, for all practical purposes, the cost of installing such a system in most motor vehicles would be prohibitively high and, therefore, not justified. However, the cost involved might very well be justified in other situations such as movement of large, heavy vehicles, illuminating systems for assisting pilots to land aircraft under conditions of limited visibility, and similar situations.

SUMMARY OF THE INVENTION

It is a general aim of the present invention to provide an illumination system which overcomes the foregoing disadvantages inherent with conventional continuous duty searchlights and which serves to minimize the undesired effect of backscattered illumination, thereby improving visibility.

More specifically, it is a principle object of the invention to provide methods and apparatus for shaping the illuminating beam emanating from a continuous duty searchlight or the like so as to insure that the area illuminated remains below a generally horizontal plane passing through the optical axes of the system, thereby permitting monitoring instruments to look along the illuminated path without having visibility degraded by backscattered light originating in areas above such generally horizontal plane.

In one of its more detailed aspects, it is an object of the invention to provide methods and apparatus for shaping the illuminating beam emanating from a continuous duty searchlight or the like so as to insure that the maximum radiant intensity of the beam generally lies in or near the horizontal plane passing through the optical axes of the system, with substantially all areas of lower radiant intensity lying below that plane. As a result of attaining this objective, illuminating beams produced in accordance with the methods of the present invention and with apparatus embodying features of the present invention are characterized by a sharp, clearly defined, relatively flat, horizontal upper edge of maximum radiant intensity as contrasted with conventional illuminating beams where the upper portions of the beam are generally disposed well above a horizontal plane passing through the optical axis of the system and, although the upper portion of the beam is characterized by light of lesser radiant intensity, it constitutes the primary source of undesired backscattered illumination as a result of its relatively close proximity to the camera.

An ancillary object of the invention is to combine the advantages of an ideal baffle with the high intrinsic radiance of the high energy light source to achieve a nearly optimum illuminator producing a beam with a perfectly sharp upper edge; yet, wherein the illuminator is of reasonably compact form and which does not require complex baffling arrangements that are, for all practical purposes, not feasible in an operating system.

DESCRIPTION OF THE DRAWINGS

These and other objects of the present invention will become more readily apparent upon reading the following detailed description and upon reference to the attached drawings, in which:

FIG. 8 is a diagrammatic perspective view of the basic components of the present invention which here permit splitting of the collimated beam emanating from a suitable arc source or the like;

FIG. 22 is a side elevational view of the exemplary system shown in FIG. 20; and, FIG. 23 is a graphical presentation of a typical beam profile in terms of radiant intensity (the ordiante in FIG. 23) and degrees of beam divergence, both left and right, from the generally horizontal optical axis of the system.

While the invention is susceptible of various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as expressed in the appended claims.

DETAILED DESCRIPTION

While the present invention might be described with sufficient clarity as to enable an understanding thereof by one skilled in the art pertaining to optical systems simply by referring to an exemplary structural embodiment of the invention as depicted in FIGS. 19-23, it is believed that a thorough understanding of the invention will be facilitated by first describing in somewhat diagrammatic and theoretical terms the overall concept of processing the collimated light beam emanating from a conventional source of high radiant intensity such, for example, as a short-arc xenon lamp, in a simple optical system wherein the collimated beam is imaged at the sharp knife edge or apex of a 90° reflecting prism, split, and the truncated halves of the thus split beam are then re-collimated and projected along substantially parallel paths and, wherein the collimating lenses employed receive light only from the upper half of their respective focal planes so as to project a pair of output beams from the exit pupils of the system characterized by sharp, well-defined, relatively flat upper edges lying substantially in a horizontal plane passing through the optical axes of the system. For this reason, the ensuing Detailed Description of the invention will involve two distinct portions—viz., a first diagrammatic and somewhat theoretical description of the invention and, thereafter, a further description of an exemplary practical embodiment of the invention.

Because the collimated beam entering the optical system at the entrance pupil is subsequently split and redirected as a pair of overlappng, essentially parallel beams, the ensuing description will refer from time to time to "left" and/or "right" portions of the system. It should be understood at the outset that such references are not made with reference to the portions of the system as viewed in the drawings but, rather, to the left and right portions of the system as one would view such portions when standing behind the illuminator and looking outwardly along the light beam emanating therefrom toward a distant target object. Identical components in the left and right hand portions of the system will, therefore, be assigned identical reference numbers; but, those in the left portion of the system will include the designation "L" with each reference number, while those in the right portion of the system will include the designation "R" with each reference number. Moreover, since the exemplary practical embodiment of the invention as depicted in FIGS. 19-23 employs two identical interleaved optical systems each having left and right portions, those portions of the second optical system will be distinguished from the identical components in the first optical system by the addition of a prime designation ("'") following each reference number.

A. Diagrammatic and/or Theoretical Description

Figure 1:
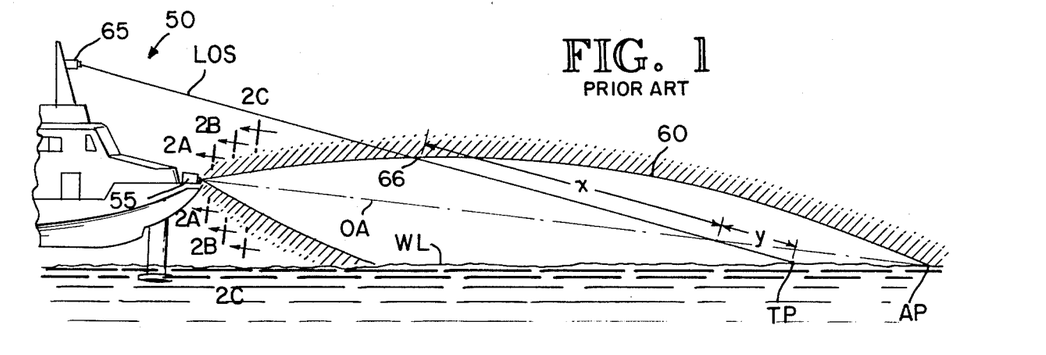
FIG. 1 is a diagrammatic side elevational view here depicting in diagrammatic form a conventional illumination system as employed on a marine vessel such, for example, as a hydrofoil vessel—it being understood that the beam as illustrated is not shown to scale and would, in actuality, be aimed at a point several thousand feet in advance of the vessel.

Referring first to FIG. 1, there has been illustrated a typical system employing a conventional continuous duty searchlight on a marine vessel such as the hydrofoil vessel generally indicated at 50. As here shown, the vessel 50 includes a conventional continuous duty searchlight 55 mounted to project an illuminating beam 60 in a broad forward aspect at grazing incidence to the waterline WL, with the beam being directed at an aim point AP which may, for example, be 4300 feet distant or more. In order to scan the illuminated area for the purpose of locating target objects in such area, a conventional low light level televsion camera 65 is here shown as mounted some distance above the illuminator 55. The field of vision of the television camera 65 is generally sufficient to encompass the entire illuminated area; and, any target object appearing within the illuminated area—e.g., a target object appearing at target point TP—will be viewed by the camera 65 along the line of sight LOS extending from the camera 65 to the target object. It is to be understood that the view as depicted in FIG. 1 is strictly diagrammatic and is not shown to scale, since the target point TP might very well be on the order of 4000 or more feet from the camera 65.

With the foregoing in mind, it will be obseved that the line of sight LOS intersects the beam 60 at point 66 and, recognizing the disparity in dimensional relationships necessitated by the drawing, substantially all of the line of sight LOS between the camera 65 and the target point TP—i.e., that portion of the line of sight LOS represented by the dimension x—will extend through the beam between the point 60 and the target point TP. Moreover, those skilled in the art will appreciate that that portion of the beam 60 lying above the optical axis OA of the system serves no useful purpose in illuminating a target object at point TP but, rather, seves only to produce backscattered illumination which serves to degrade the brightness contrast between the target object and background. And, since the point of intersection 66 generally lies relatively close to the camera 65, at the ranges being considered the problem produced is very similar to that experienced by the driver of a motor vehicle when attempting to utilize his "high beams" under foggy conditions. Ideally, if it were possible to eliminate the upper half of the beam 60 lying above a generally horizontal plane passing through the optical axis OA, it would be possible to reduce the relatively long portion x of the line of sight LOS between point 66 and target point TP to a relatively short distance y; and, consequently, the effect of backscattered light would be substantially reduced since the intersection of the line of sight LOS with the optical axis OA would be located close to the target object at point TP and at a point remote from the camera 65.

Figure 2A:
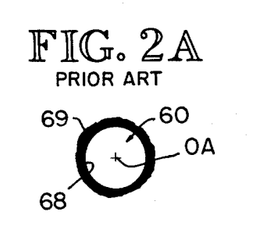
FIGS. 2A, 2B and 2C are diagrammatic transverse sectional views taken substantially along the lines 2A—2A, 2B—2B and 2C—2C in FIG. 1, here illustrating the shape of the conventional beam and the increasing diffuse nature of the beam as the beam expands radially from the optical axis of the system (it is to be understood that FIGS. 2A-2C are highly diagrammatic and that the black outer annulus surrounding the beam represents the non-illuminated atmospheric region surrounding the beam)
Figure 2B:
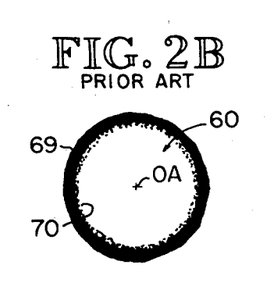
Figure 2C:
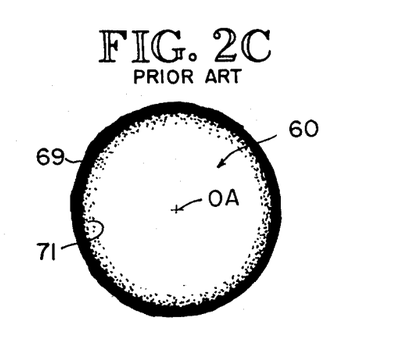

Referring to FIGS. 2A through 2C, there has been diagrammatically illustrated the shape and diffusion characteristics of a light beam 60 emanating from a conventional continuous duty searchlight such as that depicted at 55 in FIG. 1. It is to be understood that the illustrations as shown in FIGS. 1A through 2C are representative of the distributional light pattern as viewed in successively more distant transverse planes perpendicular to the optical axis OA of the system. That is, FIG. 2A depicts a transverse section through the light beam 60 at a point only a few inches from the exit pupil and, consequently, the beam appears to have a relatively sharp, clearly defined circular peripheral edge 68 surrounded by a dark non-illuminated region 69. FIG. 2B is illustrative of a transverse section taken through the same beam 60 but at a somewhat greater distance from the illuminator 55—e.g., at a distance on the order of one foot therefrom. As here depicted, the area of maximum illumination is relatively close to the optical axis OA of the system and, as one moves radially out from the optical axis OA, illumination decreases. As a consequence, the outer peripheral regions of the beam 60 tend to be somewhat diffused as indicated at 70 with such regions still being surrounded by a non-illuminated region 69. Referring next to FIG. 2C, the transverse section here depicted is, on a different scale, generally illustrative of the distributional pattern of the light beam 60 at yet a further distance from the light source 55 such, for example, as a distance on the order of five feet. As here depicted, the radial extent of the beam is further increased and, therefore, the outer peripheral regions of the beam 60 become even more diffuse as indicated at 71. As successive transverse sections are taken through the beam at progressively increasing distances, the distributional pattern of light energy tends to become more and more diffuse and, ultimately, the illumination level assumes a form in direct proportion to the radiant intensity of the searchlight (cf., FIG. 5).

Figure 3:
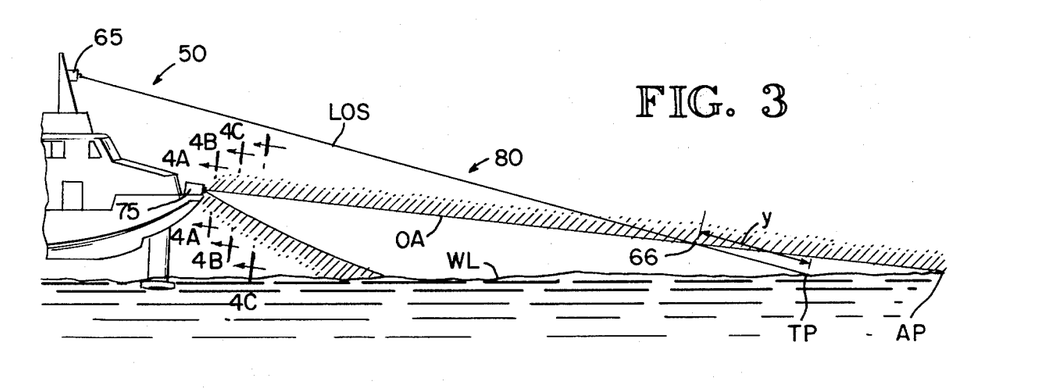
FIG. 3 is a diagrammatic side elevational view similar to FIG. 1, but here depicting an illuminating beam formed in accordance with the methos of, and utilizing apparatus embodying features of, the present invention.

Turning next to FIG. 3, there has been diagrammatically illustrated an arrangement embodying features of the present invention wherein the upper half of the beam emanating from the light source—viz., that portion of the beam disposed above a horizontal plane passing through the optical axis OA of the system—has been eliminated in accordance with the present invention. Thus, as here shown, a low backscatter illuminator 75 embodying the features of the present invention is mounted on the hydrofoil vessel 50 in the same relative position as was the conventional illuminator 55 shown in FIG. 1. Similarly, the illuminator is diagrammatically depicted as aimed at the same aim point AP, while a low light level television camera 65 located at the same position as the camera shown in FIG. 1 is monitoring a target object at the target point TP which is here at the same range from the camera as the target object depicted in FIG. 1. In this instance, the point of intersection 66 between the line of sight LOS from the camera and the beam 80 actually lies on the optical axis OA of the system and, it has been shifted to the right (as viewed in FIG. 3) to a point remote from the camera 65 and relatively close to the target object at point TP. Consequently, the only area where the backscatter illumination effect is present is in the region y between the point 66 and the point TP; and, since that region is remote from the camera 65, the degrading effect of backscatter illumination on the apparent contrast between the target object and the background is significantly decreased.

Figure 4A:
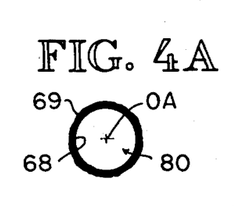
FIGS. 4A, 4B, and 4C are transverse sectional views taken substantially along the lines 4A—4A, 4B—4B and 4C—4C in FIG. 3, here depicting the shape of the beam produced in accordance with the present invention and indicating especially the relatively sharp, flat, horizontal upper edge which characterizes beams produced in accordance with the invention and which becomes even more clearly defined at increasing distances from the exit pupils of the optical system.
Figure 4B:
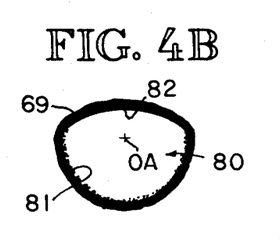
Figure 4C:
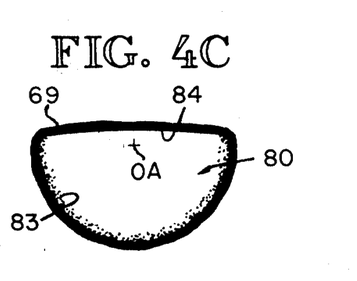

Referring to FIGS. 4A through 4C, there have been diagrammatically illustrated three transverse sectional views through the beam 80 in directions perpendicular to the optical axis OA of the illumination system at the same respective distances from the light source 75 as the distances of FIGS. 2A through 2C from the light source 55. Thus, referring to FIG. 4A, it will be noted that the transverse distributional pattern of the beam 80 is, for all intents and purposes, identical to the transverse section through beam 60 shown in FIG. 2A—it being understood that such transverse section is taken substantially at the exit pupil of the system. Thus, the beam at this point is characterized by a sharply defined peripheral edge 68 surrounded by a non-illuminated region 69.

Referring to FIG. 4B—viz., a transverse sectional view taken at a point on the order of approximately one foot from the exit pupil of the system—it will be noted that the portion of the beam 80 below a horizontal plane passing through the optical axis OA of the system is substantially identical to the corresponding portion of the prior art beam 60 depicted in FIG. 2B. That is, the lower half of the beam 80 tends to become more diffuse as indicated at 81 as the radial distance from the optical axis increases and is surrounded by a dark non-illuminated region 69. However, in this instance, the upper portion of the beam has begun to flatten out and is defined by a relatively sharp, somewhat dome-shaped, edge 82.

At a still greater distance—e.g., approximately five feet from the exit pupil of the system—the lower half of the beam 80 becomes even more diffuse at increasing radial distances from the optical axis OA as indicated at 83 in FIG. 4C. Conversely however, the upper portion of the beam 80 becomes relatively flat and defines a sharp line of demarcation between the illuminated portion of the beam 80 and the non-illuminated region 69 surrounding the beam as indicated at 84. The optical properties of this type of beam are such that at progressively increasing distances from the exit pupil of the system, the upper edge of the beam becomes even flatter and more sharply defined. That is, at progressively greater distances from the exit pupil of the system, the illumination level of the beam assumes a form in direct proportion to the radiant intensity of a searchlight in which the distribution has been split in the manner depicted in FIG. 6.

Figures 5, 6:
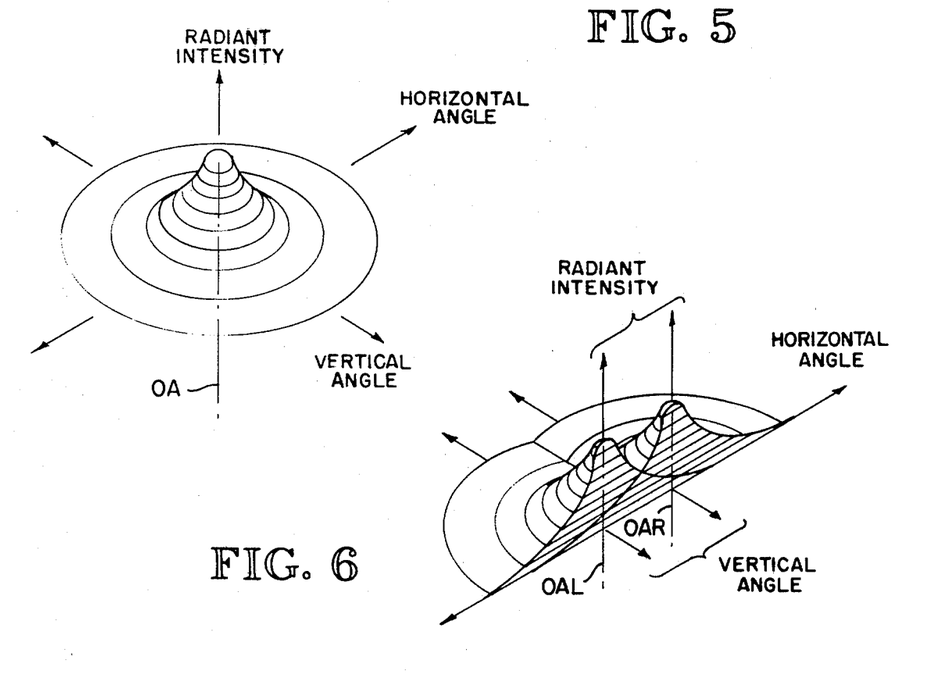
FIG. 5 is a diagrammatic, three-dimensional view here depicting a typical energy distributional pattern in a collimated beam of light produced from an arc source or the like, and wherein the region of maximum radiant intensity comprises a central core coincident with the optical axis of the system.
FIG. 6 is a view similar to FIG. 5, but here illustrating in diagrammatic form a pattern of energy distribution when the collimated beam emanating from an arc source or the like is split, with the two halves of the energy distributional pattern thus formed being superimposed upon one another in accordance with the present invention.

Referring next to FIG. 5, there has been generally indicated in diagrammatic form a three-dimensional view of a typical distributional pattern of radiant energy as viewed from various horizontal and vertical aspects. Thus, with a typical collimated light beam, radiant intensity is at its maximum along the optical axis OA and decreases progressively toward the periphery of the light beam as one moves from the optical axis OA in any direction. It is because of this phenomenon that the radial outer peripheries of beams from collimated light sources (as viewed in transverse sectional views through the beam perpendicular to the optical axis OA) tend to be of ever decreasing illumination. Referring to FIG. 6, there has been diagrammatically illustrated a similar three-dimensional view of the radiant intensity of a light beam, but here depicting the beam after it has been split in a plane bisecting the optical axis OA with the two halves of the beam being superimposed upon one another in overlapping relation and defining a pair of generally parallel optical axes OAL and OAR. Those skilled in the art will appreciate that because the two halves of the split distributions indicated in FIG. 6 are superimposed in overlapping relationship, the light contribution by each half tends to be additive with respect to the light contribution by the other half.

Figure 7:
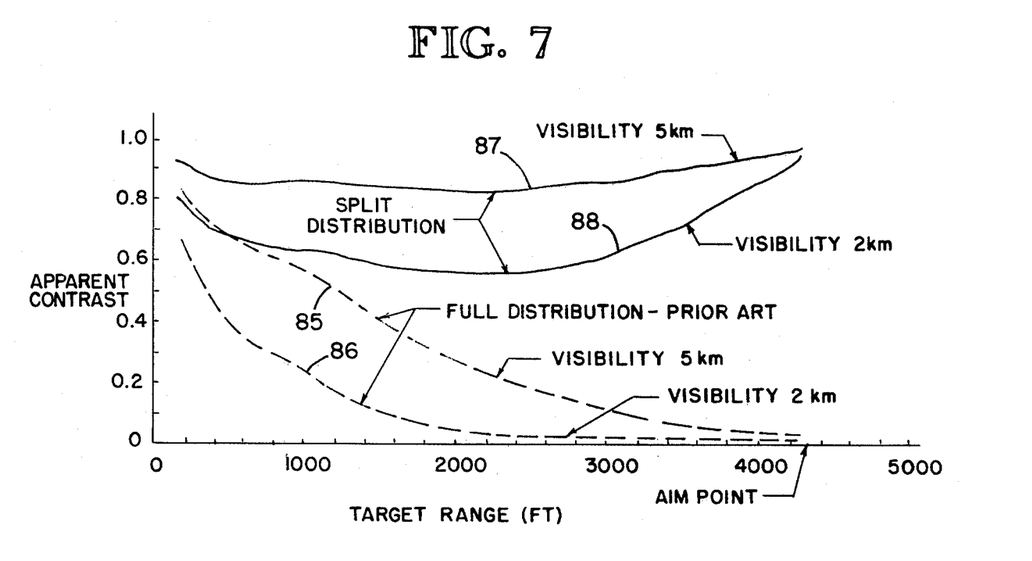
FIG. 7 is a comparative graphical presentation of the apparent contrast (the ordinate in FIG. 7) between target objects and background at different ranges (the abscissa in FIG. 7) to the target object betwen conventional prior art full distribution illuminating systems of the type shown in FIG. 1 and the present invention as shown in FIG. 3 which employs a split distribution illuminating system, with the comparisons here being made at two different conditions of meteorologic visibility—viz., meteorologic visibility of five kilometers and meteorologic visibility of two kilometers.

Turning next to FIG. 7, and considering, for example, operation in a marine environment, there has been illustrated in graphical form a comparative presentation of apparent contrast (the ordinate in FIG. 7) of targets at different ranges (the abscissa in FIG. 7) from the light source using both a conventional prior art system of the type shown in FIG. 1, and a split distribution system embodying features of the present invention and of the type shown in FIG. 3. Thus, as here depicted, the curve 85 is representative of apparent contrast between the brightness of an illuminated target object and its surrounding background when utilizing a conventional continuous duty searchlight 55 as shown in FIG. 1 under conditions where meteorologic visibility is five kilometers. It will be observed that as the range from the source of light progressively increases, apparent contrast progressively decreases. Curve 86 is illustrative of the apparent contrast at progressively increasing ranges utilizing a conventional prior art system when meteorologic visibility is reduced to two kilometers.

Curve 87 as shown in FIG. 7 is representative of apparent contrast between target objects and surrounding background where meteorologic visibility is five kilometers when utilizing a low backscatter illuminator 75 of the type shown in FIG. 3 and embodying features of the present invention. Thus, as here shown, it will be observed that apparent contrast tends to decrease from an ideal level of 1.0 to a point slightly above 0.8 at a range of approximately 2200 feet; but, thereafter, apparent contrast gradually increases. Referring to FIG. 3, it will be appreciated that such increase in apparent contrast is due to the fact that the closer the target point TP is to the aim point AP, the less will be the effect of backscattered illumination and, theoretically, at the aim point AP there is no backscattered illumination. Curve 88 in FIG. 7 is representative of apparent contrast when using the present invention under conditions of meteorologic visibility of two kilometers. It is to be noted that once again apparent contrast tends to slowly decrease to a point approximately 2200 feet down range and, thereafter, slowly increases. In both cases, the apparent contrast when practicing the present invention is significantly higher than that attainable when using conventional full distribution prior art systems; and, this is true at all operating ranges of the equipment.

Figure 8:
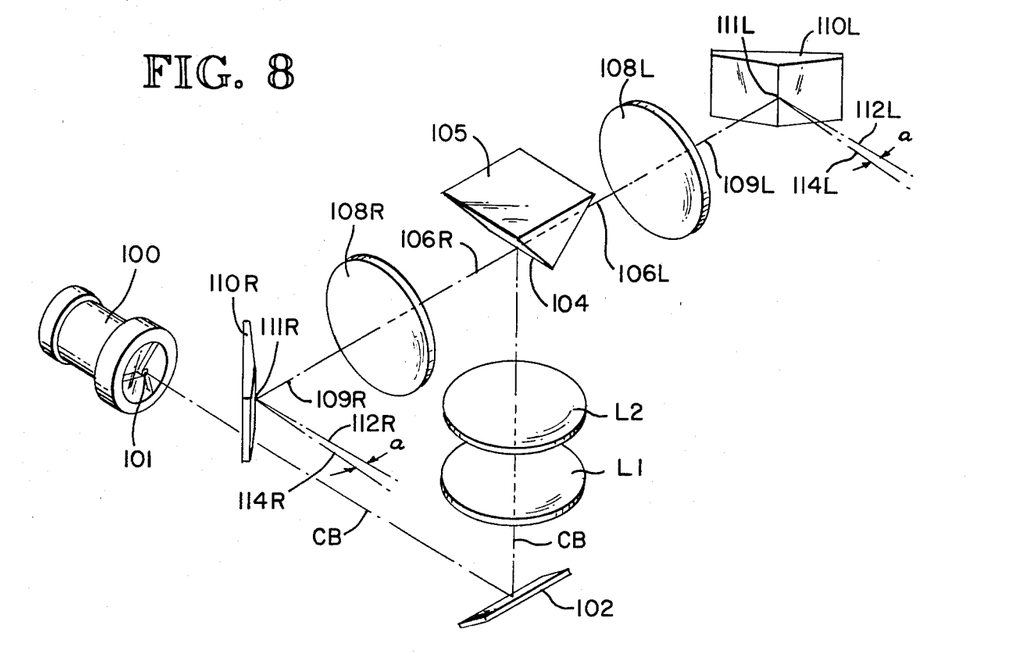

Turning to FIG. 8, there has been diagrammatically illustrated the relationship between the basic components of the system which are employed in the practice of the present invention. As here illustrated, a conventional arc-type lamp, generally indicated at 100 (which may, for example, comprise a short-arc xenon illuminator or lamp of the type manufactured by the Eimac Division of Varian in San Carlos, Calif. and known as the "VIX-500"), is here used to generate a collimated light beam, diagrammatically indicated at CB, which is here introduced into the optical system at the aperture of the light source 100, such aperture defining the entrance pupil 101 of the system. Because arc-type lamps such as that shown at 100 in FIG. 8 are not recommended for use in a vertical attitude, the collimated beam CB is here shown as being directed horizontally. The beam CB is here reflected upwardly by a dichroic mirror through a pair of coaxial spaced apart lenses L1 and L2 which serve to image the arc at the relatively sharp knife edge defined by the apex 104 of a reflecting prism 105 coated with suitable dichroic material and, preferably, having its reflective surfaces disposed at an included angle of 90°.

As the ensuing description proceeds, those skilled in the art will appreciate that the invention has herein been illustrated and described in connection with a preferred example of a general class of illuminators, all of which accomplish the desired result with but slight changes in configuration. For example, if a prism 105 having an apical angle $\theta$ is used as the splitter, the prism must be tilted so that its apex 104 defines an angle $(\theta - 90°)$ with respect to the horizontal, such that a positive value of the angle $(\theta - 90°)$ represents a condition in which that end of the prism nearest the illuminator output is elevated. In these circumstances, the respective axes 106R and 106L make the angle $2\theta$ with one another (as measured from 106L through the body of the prism 105 to 106R) and together define a plane perpendicular to the prism apex 104 and so tipped at the angle $(\theta - 90°)$ to the vertical. Mirrors in positions 110R and 110L must be positioned on these axes so as to receive the light and redirect it in a generally parallel and horizontal direction. The angular position required of each mirror is readily calculable from the foregoing requirements; and, mirrors so positioned and oriented not only redirect the light as described, but image the prism apex 104 as horizontal in both the left and right sides of the system.

In accordance with one of the important aspects of the present invention, the reflecting prism 105 serves to split the distribution image and reflects the light from respective halves thereof in opposite directions along paths indicated at 106R and 106L, respectively. In carrying out the present invention, light in the redirected halves of the distribution image is received only in the upper halves of the focal planes of respective ones of a pair of collimating lenses 108R and 108L which serve to collimate the light in the respective distribution image halves and to direct such collimated light along respective axes 109R, 109L towards the apex of each of a pair of bimirrors 110R, 110L, respectively. The bimirrors 110R, 110L, which are preferably coated with a suitable dichroic material, here serve to redirect the collimated light along horizontal and generally parallel axes. Because the mirrors 110R, 110L are bimirrors having two facets disposed at a slight angle to one another (as measured by lines normal to such facets), the number of beams exiting from the exit pupils 111L, 111R are effectively doubled. That is, the left portion of the system produces first and second output beams 112L, 114L which diverge slightly from one another at a relatively small horizontal angle α. Similarly, the right portion of the system produces a pair of light beams 112R and 114R which diverge slightly from one another at a relatively small horizontal angle α.

Figure 9:
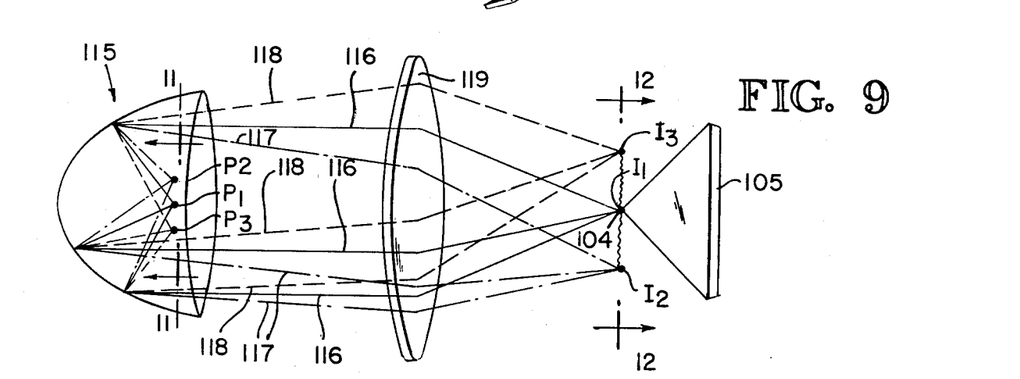
FIG. 9 is a diagrammatic plan view, slightly in perspective, of a portion of an optical system embodying features of the present invention and, wherein a vertical plane through the system, including the light splitting reflecting prism, has been reflected down into a horizontal plane for convenience and to permit clarification of the imaging aspects of the invention.

In order to facilitate an understanding of the present invention, that portion of the optical system extending from the entrance pupil 101 (FIG. 8) to the distribution splitting reflecting prism 105 has been reproduced in diagrammatic horizontal plan view in FIG. 9; however, the portion of the system from the reflecting mirror 102 (which is not depicted in FIG. 9) to the prism 105 has been reflected down into the horizontal plane of the collimated beam CB emanating from the arc source or lamp 100. Thus, referring to FIG. 9, there has been illustrated a paraboloidal reflector 115 of the type which would commonly be employed within the lamp 100. In this type of lamp, light emanating from any given point in the arc tends to be reflected by the paraboloidal reflector 115 along parallel lines. Thus, as here illustrated, light emanating from the point P1 will be reflected along parallel lines 116; light emanating from point P2 will be reflected along parallel lines 117; and, light emanating from point P3 will be reflected along parallel lines 18. The collimated beam emanating from the aperture of the lamp 100 is thus directed towards an imaging lens system—viz., the lenses L1 and L2 shown in FIG. 8 which are diagrammatically shown in FIG. 9 as a single imaging lens 119. Thus, the lens 119 serves to image the distributional pattern at the apex 104 of reflecting prism 105. More specifically, light emanating from point P1 within the parabolic reflector 115 is imaged at point I1; light emanating from point P2 is imaged at point I2; and, light from point P3 is imaged at point I3.

Figure 10:
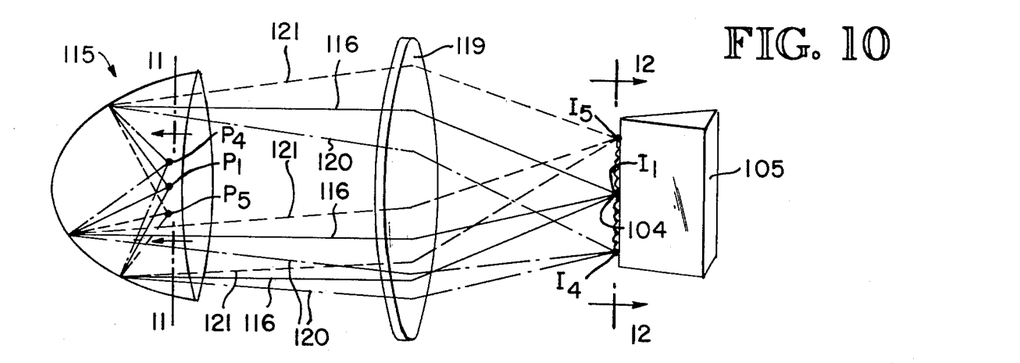
FIG. 10 is a diagrammatic side elevational view, slightly in perspective, similar to FIG. 9.
Figure 11:
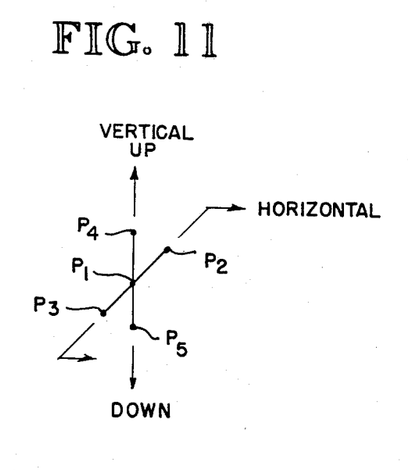
FIG. 11 is a diagrammatic perspective view taken substantially along the line 11—11 in FIGS. 9 and 10, here diagrammatically illustrating point sources of light as they might occur in a conventional arc source.

Referring next to FIG. 10, the same imaging system as depicted in plan view in FIG. 9 has been illustrated in vertical elevation in FIG. 10—again with the portion of the system from the reflecting mirror 102 (FIG. 8) to the prism 105 being reflected down into a horizontal aspect. That is, in this instance light may be considered as emanating from point P1 on the optical axis and points P4 and P5 which are respectively above and below the optical axis (as best illustrated in FIG. 11). Thus, the light emanating from point P1 is again reflected along parallel lines 116; whereas the light emanating from point P4 is reflected along parallel lines 120, and light emanating from point P5 is reflected along parallel lines 121. Such parallel rays are then imaged by the imaging lens 119 with all light emanating from points P1, P4 and P5 being respectively imaged along the sharp knife edge defined by the apex 104 of prism 105 at the respective image points I1, I4 and I5.

Figure 12:
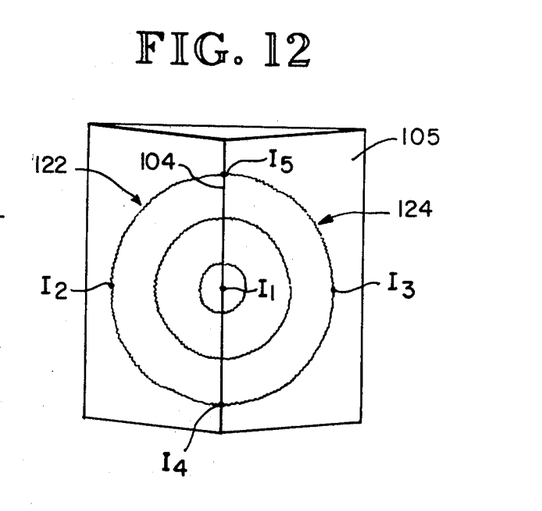
FIG. 12 is a diagrammatic perspective view taken substantially along the line 12—12 in FIGS. 9 and 10, here depicting in diagrammatic form a distributional image (which is representative of the distribution of light produced from a conventional arc source) as presented at the apex of a light splitting prism and as symbolically represented by discrete points.
Figure 13:
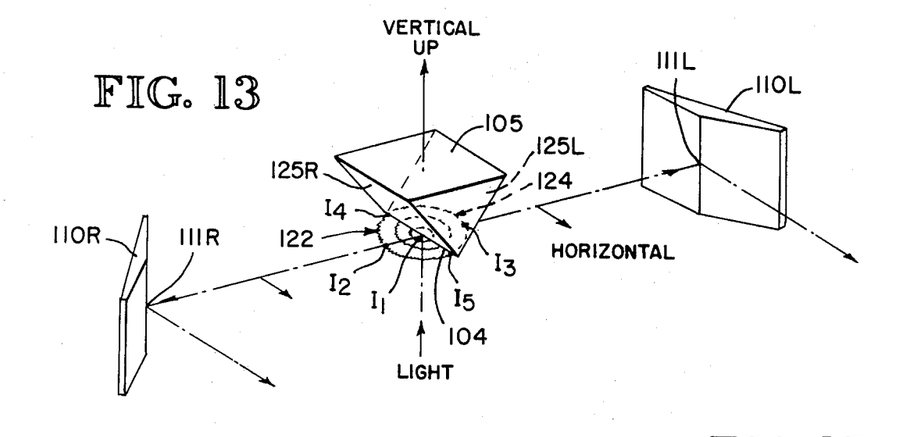
FIG. 13 is a simplified diagrammatic perspective view somewhat similar to FIG. 8, but here depicting an image or light pattern (which is representative of the distribution of light produced from an arc-source) as projected at the apex of an image splitting reflective prism and, further, illustrating the relationship thereof with the exit pupils of the system which are here coincident with a pair of bimirrors.
Figure 14:
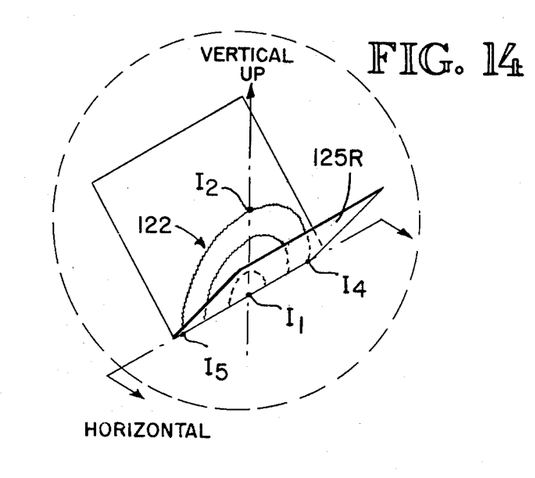
FIG. 14 is a diagrammatic perspective view of a distributional image as symbolically represented by discrete points and which would be observed if one looked back into the optical system along an optical axis emanating from the right half of the system which here would comprise either facet of the left bimirror as viewed in FIG. 13.
Figure 15:
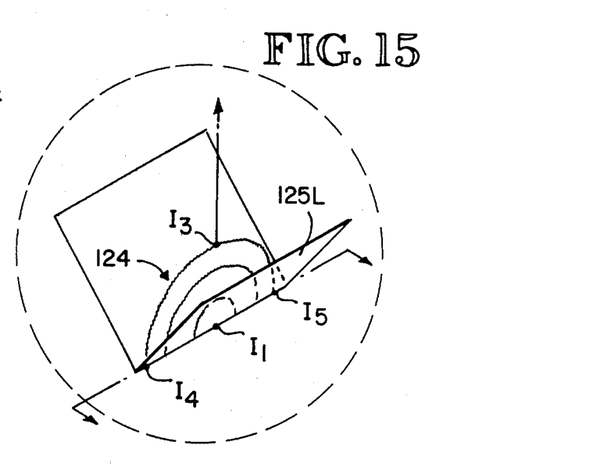
FIG. 15 is a diagrammatic perspective view similar to that shown in FIG. 14, but here depicting the distributional image as symbolically represented by discrete points and as would be observed if one looked back into the optical system along an optical axis emanating from the left half of the system—i.e., from either facet of the right bimirror as viewed in FIG. 13.

Thus, referring to FIGS. 9, 10, 11, and 12 conjointly, it will be appreciated that light from point P1 (FIG. 11) will be imaged at the apex 104 of prism 105 at point I1; light from points P4 and P5 will be respectively imaged at points I4 and I5 which also lie along the apex 104 of prism 105; and, light emanating from points P2 and P3 will be respectively imaged at points I2 and I3 in a generally horizontal plane containing the apex 104 of prism 105. As a consequence, there is produced at the horizontal plane containing the apex 104 of reflecting prism 105 an image pattern which is here representative of the lamp distribution produced from the arc (FIG. 8)—such image being symbolically represented by the points I1 through I5 and all other points therebetween. The left half of the image as viewed in FIG. 12 is designated by the reference numeral 122, while the right half of the distribution image is designated by the reference numeral 124.

Figure 16:
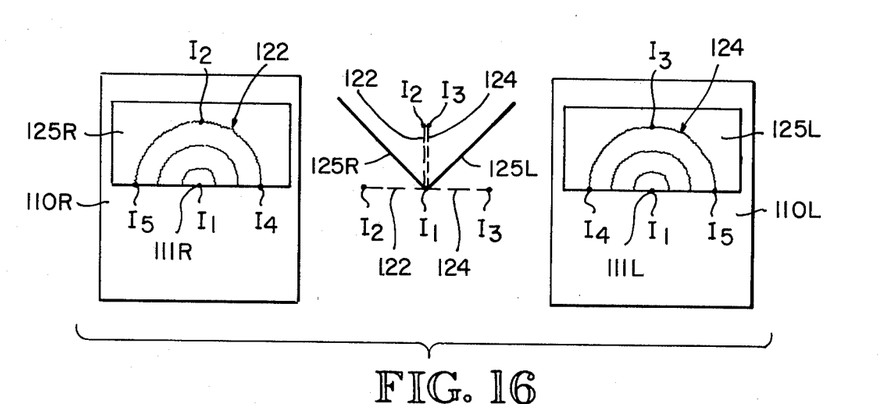
FIG. 16 is a diagrammatic front elevational view here depicting the generation of the two halves of the split distributional image as symbolically represented by 5 discrete points and, depicting also how the two image halves would respectively appear when looking back into the optical system along the substantially parallel optical axes of the system emanating from either facet of each of the pair of bimirrors shown in FIG. 13.

As best shown in FIGS. 13 through 16, the distributional image represented by points I1–I5 is split by the reflecting prism 105 and, were one to look into the right facet 125R of the prism 105, he would observe that half of the distributional pattern represented at 122 in FIG. 12—viz., that half of the distributional image defined by points I1, I4, and I5 lying along the apex 104 of the prism 105, and by point I2. That half 122 of the distributional image would appear to be standing upright in a vertical plane bisecting the prism 105 along its apex 104 (as best shown in FIG. 16). Similarly, were one to look backwardly toward the exit pupil 111R of the system and into either facet of the reflecting bimirror 110R, one would see the right facet 125R of prism 105 and the portion 122 of the distributional image containing points I1, I2, I4, and I5, as best illustrated by reference to FIGS. 14 and 16 conjointly. Looking backwardly towards the exit pupil 111L along the optical axis of the left-hand portion of the system, one would see the left-hand facet 125L of prism 105 and that portion 124 of the distributional image defined by image points I1, I3, I4, and I5.

Figure 17:
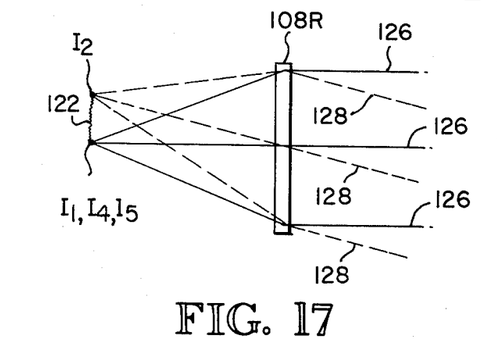
FIG. 17 is a diagrammatic side elevational view here depicting how light is collimated by a collimating lens in the right half of the optional system to produce an output beam therefrom characterized by its sharp, relatively flat, horizontal upper edge.

Referring next to FIG. 17, there has been diagrammatically illustrated how the present optical system serves to invert the split or truncated distributional image half 122 so as to produce an output beam having a relatively sharp, well-defined, flat, horizontal edge. Thus, as here indicated, that portion 122 representing the half of the distributional image defined by points I1, I2, I4, and I5 is directed to collimating lens 108R and, since that portion of the distributional image contains no light source in the lower half of the focal plane of lens 108R, the collimated beam emanating from the lens 108R is characterized by a relatively sharp, flat, horizontal upper edge defined by parallel lines 126 emanating from the system. Similarly, light emanating from point I2 in the portion 122 of the distributional image is directed along parallel lines 128 which tend to diverge downwardly from the optical axis of the system.

As a consequence of this construction, assuming the exit pupil 111R (FIG. 13) to be generally circular, a transverse sectional view through the collimated beam emanating from lens 108R and taken adjacent the exit pupil would appear circular in configuration, as indicated in FIG. 4A; whereas in successive transverse sectional views taken at greater distances from the exit pupil, the upper half of the beam located above a horizontal plane passing through the optical axis of the system would become progressively flatter and sharper, as best indicated in FIGS. 4B and 4C. Since collimating lens 108R receives no light from the lower half of its focal plane, there is no tendency for the beam emanating from the exit pupil 111R to diverge upwardly from the horizontal plane passing through the optical axis of the system. In effect, when considering only the right-hand exit pupil 111R, only half of the distributional image—viz., that portion 122 of the image containing points I1, I2, I4, and I5—is projected outwardly with the upper, flat, sharp edge of the collimated beam being defined by light emanating from image points I1, I4, I5.

Figure 18:
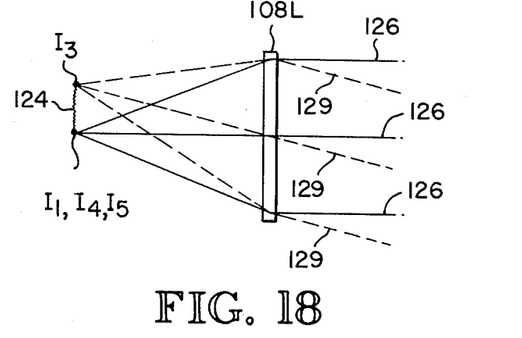
FIG. 18 is a view identical to FIG. 17, but here illustrating the formation of a collimated output beam in the left half of the optical system.

Similarly, the remaining half 124 of the distributional image is inverted by lens 108L so as to produce a collimated beam emanating from the left-hand exit pupil 111L. In this case, light emanating from points I1, I4 and I5 is again directed along parallel lines 126 (FIG. 18) while light from point I3 exits from the lens 108L along parallel lines 129 which diverge downwardly from the optical axis of the system. Consequently, the upper edge of the collimated beam exiting from the exit pupil 111L (FIG. 13) comprises a generally sharp, flat, horizontal edge which corresponds to light emanating from points I1, I4, and I5 in the distributional image half 124. That is, in both the right hand and left hand portions of the optical system, the beams emanating from exit pupils 111R and 111L have their upper flat edges defined by points of light I1, I4, I5 lying along the apex 104 of prism 105—vis., the upper edges of the beams are defined by that portion of the light distribution from the lamp 100 which is imaged along the sharp knife edge, or apex, 104 of the prism 105 and which serves to truncate or bisect the distribution image along a line passing through, and normal to, the axis of the light beam.

Thus, there has hereinabove been described an exemplary system wherein a collimated beam exiting from a suitable arc-source 100 of high radiant intensity has its distributional image split, with the two halves of the thus split image being directed in opposite directions into only the upper half of the focal planes of a pair of collimating lens and, with such distribution image halves being inverted by the collimating lenses, turned, and redirected along generally parallel horizontal optical axes without illumination of the space above a horizontal plane passing through the optical axes of the system.

B. Practical Application of the Invention

Figure 19:
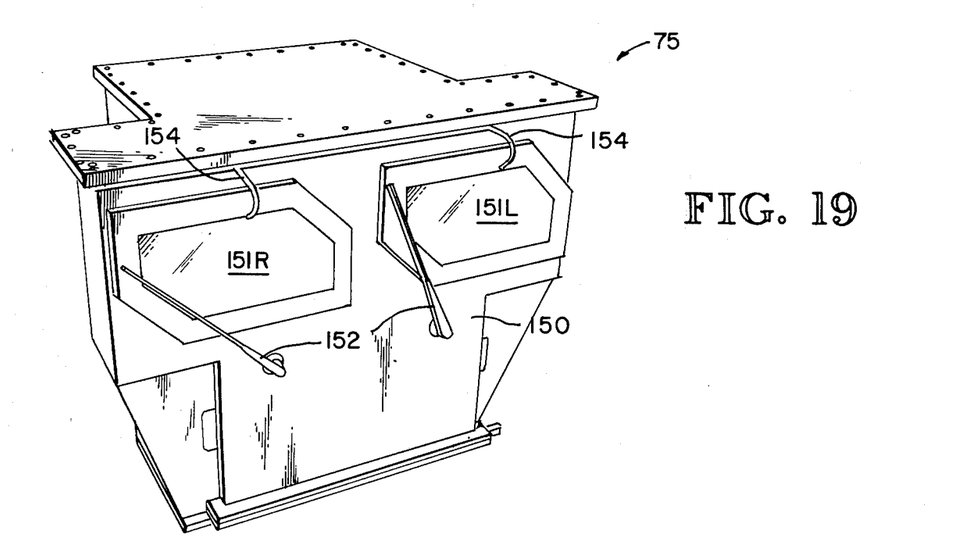
FIG. 19 is a perspective view here illustrating a typical housing as might be used with an optical illuminating system embodying features of the present invention.

Turning to FIG. 19, there has been illustrated an exemplary illuminator 75 embodying features of the present invention and which here permits the projection of a beam 80 (FIGS. 3 and 4A–4C) having a broad forward aspect of relatively high radiant intensity along a horizontal plane passing through the optical axes of the system; yet, wherein there is substantially no illumination of the space above such generally horizontal plane. It is to be understood that when referring to a "horizontal plane" passing through the optical axes of the system, such plane will actually be inclined slightly under most operating conditions so as to intersect a remote aim point AP (FIG. 3) with grazing incidence. Generally stated, such downward angular inclination will be on the order of $\frac{1}{4}°$; and, preferably, the illuminator 75 will be mounted in suitable gimbals or the like (not shown in detail) in any conventional manner so as to maintain the desired angular inclination of the optical axes OA of the system with respect to the water line WL even though the hydrofoil or similar vessel 50 tends to pitch during movement through the water.

As depicted in FIG. 19, it will be noted that the illuminator 75 includes a housing 150 having a pair of horizontally spaced, light-transparent windshields 151R, 151L made of glass or the like. Since the apparatus will, when used with marine vessels moving through the water, be exposed to water spray and various contaminants such as salt water, suitable windshield wipers 152 are provided for maintaining the protective windshields 151R, 151L clear of spray. Such wipers may be driven by any suitable source of power (not shown) such, for example, as an electric motor or the like. Moreover, to insure that the windshields remain clean, suitable nozzles 154 may be provided for spraying a cleansing solvent on the windshields in any manner well known to those skilled in the art.

Figure 20:
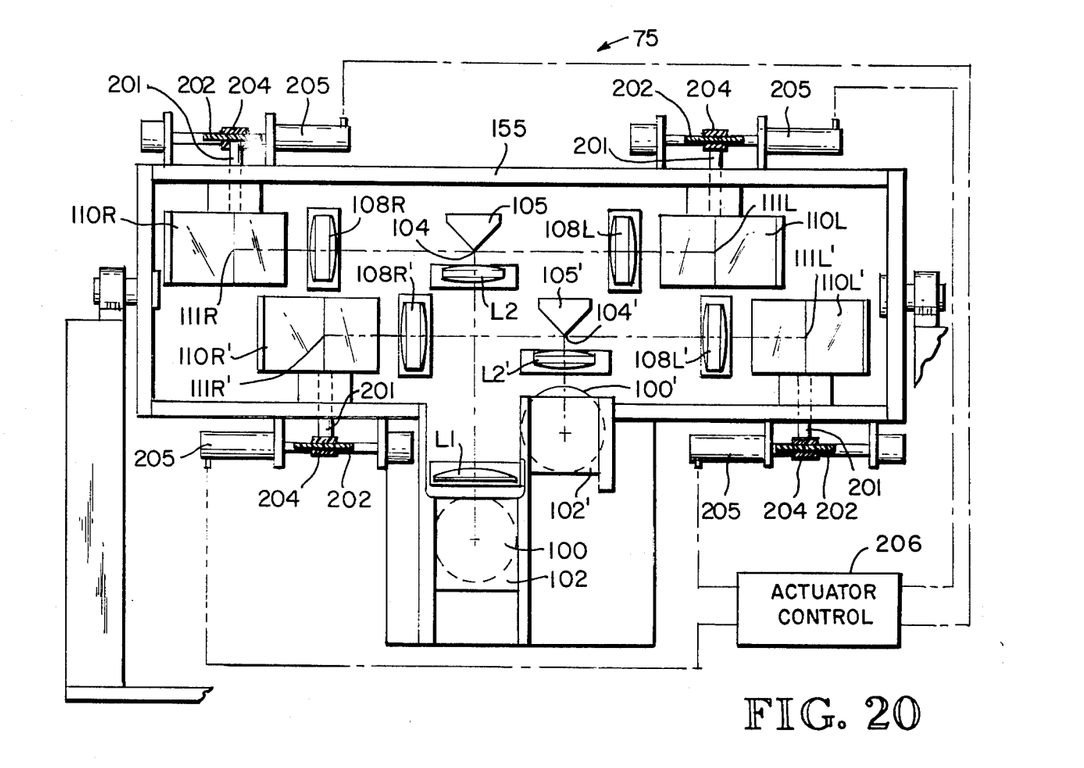
FIG. 20 is a front elevational view of an optical illuminating system embodying features of the present invention with the system here being shown with the housing removed and with an actuating mechanism for panning the bimirrors being shown partially in diagrammatic block-and-line form.
Figure 21:
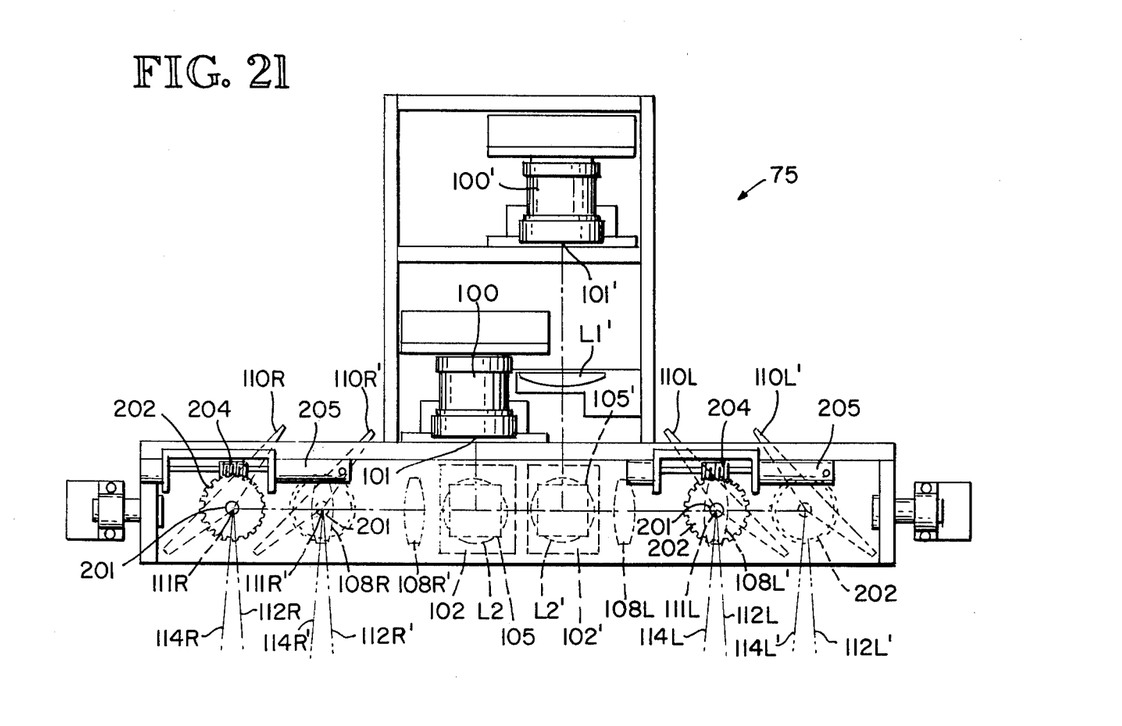
FIG. 21 is a plan view of the exemplary system shown in FIG. 20.
Figure 22:
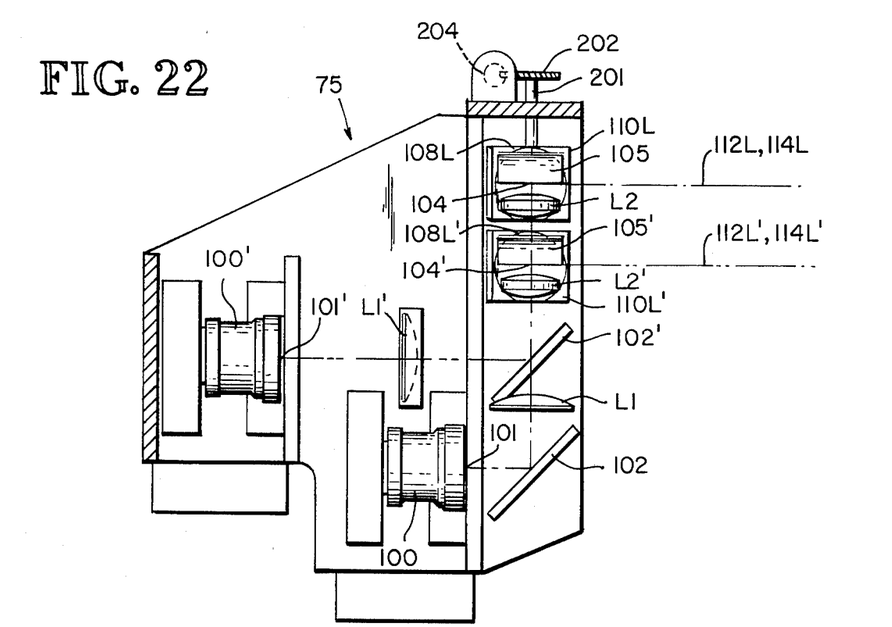

Turning now to FIGS. 20, 21, and 22 conjointly, an illuminator 75 embodying the features of the present invention has been illustrated with the cover 150 removed for purposes of clarity. As here shown, it will be noted that the illuminator includes a frame 155 within which is mounted a suitable short-arc xenon lamp 100 or other suitable source of collimated light having high radiant intensity and wherein the collimated beam entering the entrance pupil 101 of the optical system is directed along a horizontal path and reflected vertically upward by means of a dichroic mirror 102 mounted in frame 155 and disposed at an angle of 45° to the collimated beam (as best illustrated in FIG. 22). The beam is thus reflected upwardly along a vertical path and imaged by lenses L1, L2 at the apex 104 of reflecting prism 105 with the axis of the beam being imaged on the sharp knife edge of the prism so as to truncate, or bisect, the beams distributional light pattern. The prism 105 serves to split the distribution image as previously indicated, with light from one half of the image being directed to the right hand portion of the optical system (i.e., to the left as viewed in FIGS. 20 and 21) so that light in the beam is presented only in the upper half of the focal plane of collimating lens 108R which here serves to direct a collimated beam towards bimirror 110R. Since bimirror 110R is disposed at an angle of approximately 45° to the collimated beam emanating from lens 108R (as best illustrated in FIG. 21), it serves to direct a pair of slightly divergent beams 112R, 114R along divergent axes leaving the exit pupil 111R at the apex of bimirror 110R. Light from the remaining half of the distributional image is directed to the left hand portion of the system (i.e., to the right as viewed in FIG. 21) through collimating lens 108L to bimirror 110L so as to produce divergent beams 112L, 114L leaving exit pupil 111L at the apex of bimirror 110L.

In the exemplary form of the invention shown in FIGS. 20–23, a second optical system is provided which is somewhat offset with respect to the first optical system described above; but, which is otherwise identical thereto in all functional respects. Thus, the second system includes an identical short-arc xenon lamp 100' which serves to direct a beam horizontally through lens L1' to a dichroic reflective mirror 102' which here serves to redirect the beam vertically upward through lens L2' to the apex 104' of prism 105'. Those skilled in the art will appreciate that the positioning of lenses L1' and L2' on opposite sides of the dichroic mirror 102' produces no change in the optical characteristics of the system as compared with the first optical system described above wherein both lenses L1, L2 are between the dichroic mirror 102 and the prism 105. Thus, the arrangement is such that the prism 105' associated with the second optical system serves to split the distributional image, directing light from one-half of the image to the right hand portion of the system (i.e., to the left as viewed in FIG. 20) through collimating lens 108R' to bimirror 110R' which serves to redirect the collimated and inverted distributional image from exit pupil 111R' along a pair of slightly divergent paths 112R', 114R'. Light from the remaining half of the distributional image is directed to the left portion of the system (i.e., to the right as viewed in FIG. 20) through collimating lens 108L' to bimirror 110L' and, thence, from the exit pupil 111L' along slightly divergent paths 112L', 114L'.

Thus, it will be appreciated that the composite beam 80 (FIG. 3) emanating from the exemplary illuminator 75 depicted in FIGS. 20-22 comprises eight separate beams which, in the far field (i.e., at a predetermined, non-critical, distance from the exit pupils 111R, 111L), are superimposed upon one another in the interleaved fashion diagrammatically illustrated in FIG. 6—viz., beams 112R, 114R, 112L and 114L emanating from the first optical system; and, beams 112R', 114R', 112L' and 114L' emanating from the second optical system.

Figure 23:
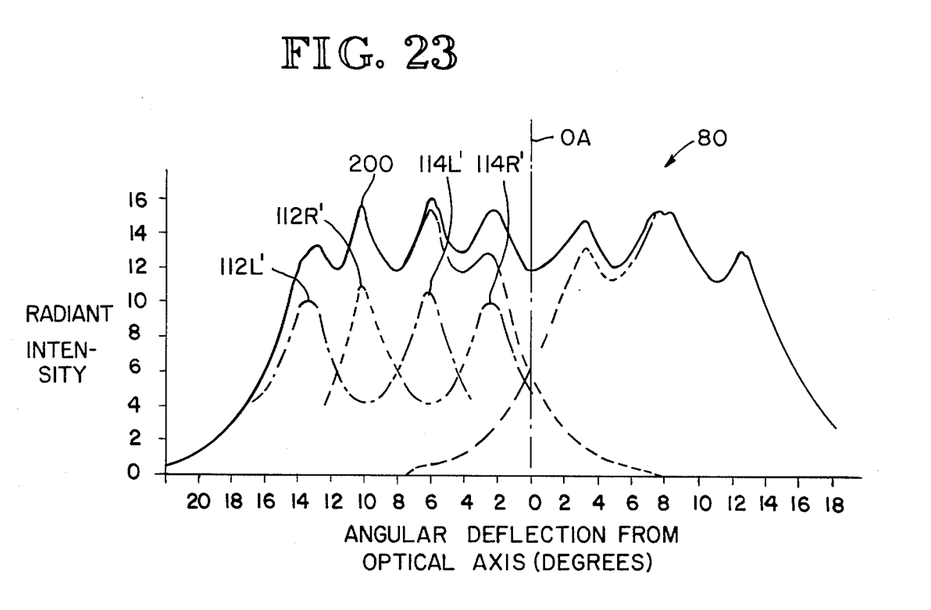

Referring to FIG. 23, there has been illustrated in diagrammatic fashion a horizontal profile of the beam 80 thus formed, with radiant intensity being depicted on the ordinate and degrees of divergence from the optical axis OA of the system being indicated on the abscissa. As here shown, the peaks 112L', 112R', 114L' and 114R' correspond to the points of maximum radiant intensity corresponding to the like designated beams emanating from the second optical system described above. Because of the additive effect of the radiant intensity produced by each individual overlapping beam portion, the overall intensity of the composite beam produced by both optical systems is reflected by the curve 200. In short, the invention as hereinabove described provides a composite illuminating beam defined by eight separate discrete beams and having a broad horizontal forward aspect with maximized radiant intensity along the optical axes of the system; yet, wherein transverse sections drawn through the beam in planes normal to the optical axes thereof are characterized by a beam having a flat, sharp, well-defined, upper edge substantially coincident with a horizontal plane passing through the optical axes of the system.

In carrying out the present invention, and as best illustrated in FIGS. 20 and 21, provision is made for panning the bimirrors 110L, 110R, 110L' and 110R' so as to permit the beam 80 to sweep back and forth from left to right in a horizontal plane as the vessel 50 (FIG. 1) moves through the water. To accomplish this, each bimirror is mounted on the frame 155 of the illuminator 75 with freedom for limited and controlled angular rotation about an axis coincident with the vertically disposed apex of the mirror. Since the actuating mechanisms for all four bimirrors 110L, 110R, 110L' and 110R' are identical, it should suffice to describe only one. As here shown, bimirror 110R, for example, is mounted for rotation about a vertical axis coincident with its apex and passing through the exit pupil 111R of the system by means of a driven shaft 201 journaled for rotation in frame 155 and having a pinion gear 202 affixed to its upper end. Pinion gear 202 is here actuated by a worm gear 204 adapted to be rotationally driven by means of a suitable servo motor 205 which may, for example, take the form of any conventional and well-known actuating mechanism. Thus, as best illustrated in FIG. 21, it will be apparent that as the worm gear 204 is rotationally driven in, for example, a counter-clockwise direction as viewed in FIG. 22, pinion 202 is rotated in a counter-clockwise direction so as to pivot bimirror 110R in a counter-clockwise direction about the vertical axis coincident with its apex. The four actuators 205 associated with the four bimirrors may be respectively controlled by means of any suitable conventional actuator control mechanism 206 (FIG. 21) which serves to insure that the bimirrors are panned synchronously and in unison.

Although not illustrated in the drawings, those skilled in the art will appreciate that the nature of short-arc xenon lamps such as the lamps 100, 100' is such as to generate considerable amounts of heat. Therefore, systems embodying the invention preferably include suitable means for cooling the critical components of the system. For example, suitable air-cooling systems (not shown) can be provided for passing coolant air streams over and around the lamps 100, 100' and, preferably, against the surfaces of the reflecting mirrors—especially, mirrors 102, 102'—for conveying heat from the system through any suitable and conventional heat exchanger (not shown).

Those skilled in the art will appreciate that there have herein been described exemplary methods and apparatus for forming an illuminating beam characterized by: (i) its broad horizontal forward aspect; (ii) the absence of light in the space above a horizontal plane passing through the optical axes of the system; (iii) a sharp, generally flat horizontal well-defined, upper beam edge; and (iv), high radiant intensity in the region of the beam at, and immediately below, the horizontal plane passing through the optical axes of the system; thereby minimizing the effect of back-scattered illumination and substantially improving the visibility achievable with the system.

I claim:

1. The method of forming an illuminating beam characterized by the absence of light in the space above a horizontal plane containing the optical axes of an optical system of the type having an entrance pupil, first and second exit pupils generally located on parallel optical axes, an image splitting reflecting prism, and a series of imaging and collimating lenses, comprising the steps of:
   (a) forming a collimated light beam;
   (b) projecting the collimated light beam through an aperture comprising the entrance pupil of the optical system;
   (c) imaging the collimated light beam at the apex of the image splitting reflecting prism with the axis of the beam being coincident with the prism apex so as to split the distribution image of the beam into first and second generally equal halves directed in generally opposite directions by reflection from the prism and with the respective halves of the distribution image being disposed in the upper halves of the focal planes of respective ones of first and second collimating lenses;
   (d) collimating and inverting the respective halves of the distribution image by directing the light in the upper halves of the focal planes of the first and second collimating lenses through the lenses and towards respective ones of the first and second exit pupils of the optical system; and,
   (e) directing the collimated beams exiting from the first and second exit pupils along generally parallel optical axes to form an illuminating beam having a broad forward aspect and essentially devoid of light in the space above a generally horizontal plane passing through the optical axes of the system.

2. The method of claim 1 wherein the collimated light beam formed in step (a) is formed by an arc-source and a paraboloidal reflector.

3. The method of claim 1 wherein the image splitting prism is a reflecting prism having reflective surfaces defining an included angle of 90°, and the respective halves of the distribution image formed at the apex of the prism are reflected in opposite directions by the prism.

4. The method of claim 1 wherein first and second mirrors are disposed in respective ones of the paths of the halves of the distribution image for directing the beams exiting from respective ones of the first and second exit pupils along generally parallel optical axes.

5. The method of claim 4 wherein the first and second mirrors are each mounted with freedom for controlled movement about vertical axes so as to permit horizontal panning of the illuminating beams reflected therefrom while maintaining the optical axes of the system passing through the first and second exit pupils essentially parallel.

6. The method of claim 1 wherein the first and second exit pupils of the optical system are formed at the respective apexes of first and second bimirrors so that the collimated beam exiting from each of the first and second exit pupils is defined by a pair of beams having slightly diverging axes leaving the respective exit pupil.

7. The method of claim 6 wherein the four beams exiting from the first and second exit pupils respectively overlap one another in the far field so as to form an illuminating beam having a broad forward aspect and essentially devoid of light in the space above a horizontal plane passing through the optical axes of the optical system.

8. The method of claim 6 wherein the first and second bimirrors are each mounted with freedom for controlled movement about vertical axes passing through their respective apexes so as to permit horizontal panning of the illuminating beams reflected therefrom while maintaining the optical axes of the system passing through the first and second exit pupils essentially parallel.

9. The method of claim 1 wherein a reflective surface is interposed between the entrance pupil and the reflecting prism for reflecting the collimated light beam along an axis bisecting the prism apex.

10. The method of claim 9 wherein the reflective surface is a dichroic mirror.

11. The method of claim 4 wherein the first and second mirrors are dichroic mirrors.

12. The method of claim 6 wherein the first and second bimirrors are dichroic bimirrors.

13. The method of claim 1, 10, 11 or 12 wherein the prism is a dichroic reflecting prism.

14. The method of forming an illuminating beam characterized by the absence of light in the space above a horizontal plane containing the optical axes of an optical system of the type having first and second entrance pupils, first and second exit pupils generally located on parallel optical axes and operatively associated with the first entrance pupil, third and fourth exit pupils generally located on parallel optical axes and operatively associated with the second entrance pupil, first and second image splitting reflecting prisms, and a series of imaging and collimating lenses, comprising the steps of:

(a) forming first and second collimated light beams;

(b) projecting the first and second collimated light beams through respective different ones of first and second apertures comprising the first and second entrance pupils of the optical system;

(c) imaging the first and second collimated light beams at the respective apexes of the first and second image splitting reflecting prisms with the axis of each beam being coincident with the respective prism apex so as to split the distribution image of each of the first and second beams into first and second generally equal halves directed in generally opposite directions by reflection from the respective ones of the first and second prisms and with the respective halves of the distribution images being disposed in the upper halves of the focal planes of respective ones of first and second collimating lenses associated with the first reflecting prism and in the upper halves of the focal planes of respective ones of the third and fourth collimating lenses associated with the second reflecting prism;

(d) collimating and inverting the respective halves of the distribution image formed by the first prism by directing the light in the upper halves of the focal planes of the first and second collimating lenses through the lenses and towards respective ones of the first and second exit pupils of the optical system;

(e) collimating and inverting the respective halves of the distribution image formed by the second prism by directing the light in the upper halves of the focal planes of the third and fourth collimating lenses through the lenses and towards respective ones of the third and fourth exit pupils of the optical system; and, (f) directing the collimated beams exiting from the first, second, third and fourth exit pupils along generally parallel optical axes to form an illuminating beam having a broad forward aspect and essentially devoid of light in the space above a generally horizontal plane passing through the optical axes of the system.

15. The method of claim 14 wherein first, second third and fourth mirrors are disposed in respective ones of the paths of the halves of the distribution images formed by the first and second prisms for directing the beams exiting from respective ones of the first, second, third and fourth exit pupils along generally parallel optical axes.

16. The method of claim 15 wherein the first, second, third and fourth mirrors are each mounted with freedom for controlled movement about vertical axes so as to permit horizontal panning of the illuminating beams reflected therefrom while maintaining the optical axes of the system passing through the first, second, third and fourth exit pupils essentially parallel.

17. The method of claim 14 wherein the first, second, third and fourth exit pupils of the optical system are formed at the respective apexes of first, second, third and fourth bimirrors so that the collimated beam exiting from each of the first, second, third and fourth exit pupils is defined by a pair of beams having slightly diverging axes leaving the respective exit pupil.

18. The method of claim 17 wherein the eight beams exiting from the first, second, third and fourth exit pupils respectively overlap one another in the far field so as to form an illuminating beam having a broad forward aspect and essentially devoid of light in the space above a horizontal plane passing through their optical axes.

19. The method of claim 17 wherein the first, second, third and fourth bimirrors are each mounted with freedom for controlled movement about vertical axes passing through their respective apexes so as to permit horizontal panning of the illuminating beam reflected therefrom while maintaining the optical axes of the system passing through the first, second, third and fourth exit pupils essentially parallel.

20. The method of forming an illuminating beam characterized by the absence of light in the space above a horizontal plane containing the optical axes of an optical system of the type having an entrance pupil, first and second exit pupils generally located on parallel optical axes, an image splitting reflecting prism having its apex facing downwardly and oriented in a direction parallel to the optical axes of the illumination system, and a series of imaging and collimating lenses, comprising the steps of:

(a) forming a collimated light beam;

(b) projecting the collimated light beam in a horizontal direction through an aperture comprising the entrance pupil of the optical system;

(c) reflecting the collimated light beam in a vertical direction towards the apex of the image splitting reflecting prism;

(d) imaging the collimated light beam at the downwardly facing apex of the image splitting reflecting prism with the axis of the beam being coincident with the prism apex so as to split the distribution image of the beam into first and second generally equal halves directed in generally opposite horizontal directions by reflection from the prism and with the respective halves of the distribution image being disposed in the upper halves of the focal planes of respective ones of first and second collimating lenses;

(e) collimating and inverting the respective halves of the distribution image by directing the light in the upper halves of the focal planes of the first and second collimating lenses through the lenses and towards respective ones of the first and second exit pupils of the optical system; and, (f) directing the collimated beams exiting from the first and second exit pupils along axes generally parallel to one another and to the apex of said image splitting reflective prism to form an illuminating beam having a broad forward aspect and essentially devoid of light in the space above a generally horizontal plane passing through the optical axes of the system.

21. A continuous duty low backscatter illuminator comprising, in combination:

(a) an optical system having (i) an entrance pupil and (ii), first and second exit pupils disposed on generally parallel optical axes;

(b) means for forming a collimated light beam of relatively high radiant intensity and for directing the collimated beam thus formed through said entrance pupil of said optical system;

(c) an image splitting reflecting prism mounted in said illuminator;

(d) means for imaging the distribution image formed by the collimated light beam at said entrance pupil at the apex of said reflecting prism so as to split the distribution image along a line bisecting the axis thereof to form first and second halves of the distribution image which are respectively reflected in generally opposite directions by said reflecting prism;

(e) first and second means for collimating respective ones of the first and second halves of the distribution image formed at the apex of said prism, said first and second collimating means being mounted in said illuminator relative to said reflecting prism so as to receive light only in the upper halves of their respective focal planes so that upon collimation of the light in the first and second halves of the distribution image output beams are formed at each of said first and second exit pupils characterized by the absence of light in the space above a horizontal plane passing through the optical axes of said optical system; and, (f) means for imaging the first and second halves of the distribution image at respective ones of said first and second exit pupils so as to form a pair of generally parallel beams of light which overlap in the far field so as to define an illumination beam having a broad forward aspect and essentially devoid of light in the space above a horizontal plane passing through the generally parallel axes of said optical system.

22. A continuous duty illuminator as set forth in claim 21 wherein said means for forming a collimated light beam of relatively high radiant intensity comprises an arc-source disposed at the focal point of a paraboloidal reflector having an output aperture defining said entrance pupil.

23. A continuous duty illuminator as set forth in claim 21 wherein said image splitting prism comprises a reflecting prism having reflective surfaces defining an included angle of 90°.

24. A continuous duty illuminator as set forth in claim 23 wherein said image splitting reflecting prism is coated with dichroic material.

25. A continuous duty illuminator as set forth in claim 21 wherein a reflective surface is interposed between said entrance pupil and said reflecting prism for reflecting the collimated beam projected through said entrance pupil towards the apex of said prism along an axis bisecting said prism apex.

26. A continuous duty illuminator as set forth in claim 25 wherein said reflective surface is dichroic.

27. A continuous duty illuminator as set forth in claim 21 wherein first and second mirrors are mounted in said illuminator in the paths of the output beams from respective ones of said first and second collimating means for directing the beams exiting from respective ones of said first and second exit pupils along generally parallel optical axes.

28. A continuous duty illuminator as set forth in claim 27 wherein said first and second mirrors are each mounted in said illuminator with freedom for controlled movement about vertical axes so as to permit horizontal panning of the illuminating beams reflected therefrom while maintaining the optical axes of said optical system passing through said first and second exit pupils essentially parallel, and further including means for rotating said first and second mirrors about their vertical axes while maintaining the optical axes of said optical system essentially parallel.

29. A continuous duty illuminator as set forth in claim 27 wherein said first and second mirrors are coated with dichroic material.

30. A continuous duty illuminator as set forth in claim 21 wherein first and second bimirrors are mounted in said illuminator in the paths of the output beams from respective ones of said first and second collimating means, and wherein the centers of said first and second exit pupils of the optical system are coincident with the apexes of respective ones of said first and second bimirrors so that the collimated beam exiting from each of said first and second exit pupils is defined by a pair of beams having slightly diverging axes leaving the respective exit pupil.

31. A continuous duty illuminator as set forth in claim 30 wherein the four beams exiting from said first and second exit pupils respectively overlap one another in the far field so as to form an illuminating beam having a broad forward aspect and essentially devoid of light in the space above a horizontal plane passing through the optical axes of said optical system.

32. A continuous duty illuminator as set forth in claim 30 wherein said first and second bimirrors are each mounted in said illuminator with freedom for controlled movement about respective vertical axes passing through their apexes so as to permit horizontal panning of the illuminating beams reflected therefrom while maintaining the optical axes of said optical system passing through said first and second exit pupils essentially parallel, and further including means for rotating said first and second bimirrors about the vertical axes passing through their respective apexes while maintaining the optical axes of said optical system essentially parallel.

33. A continuous duty illuminator as set forth in claim 30 wherein said first and second bimirrors are coated with dichroic material.

34. A continuous duty illuminator as set forth in claims 21, 26, 29 or 33 wherein said reflecting prism is coated with dichroic material.

35. A continuous duty low backscatter illuminator comprising, in combination:
 (a) an optical system having (i) an entrance pupil and (ii), first and second exit pupils disposed on parallel generally horizontal optical axes;
 (b) means for forming a collimated light beam of relatively high radiant intensity and for directing the collimated beam thus formed in a horizontal direction through said entrance pupil of said optical system;
 (c) an image splitting reflecting prism mounted in said illuminator with its apex facing downwardly and disposed in a vertical plane parallel to the optical axes of said system,
 (d) means for reflecting the collimated beam vertically upward towards the downwardly facing apex of said prism and with the axis of the beam intersecting said apex;
 (e) means for imaging the distribution image formed by the collimated light beam at said entrance pupil at the downwardly facing apex of said reflecting prism so as to split the distribution image along a line bisecting the axis thereof to form first and second halves of the distribution image which are respectively reflected in generally opposite horizontal directions by said reflecting prism;
 (f) first and second means for collimating respective ones of the first and second halves of the distribution image formed at the apex of said prism, said first and second collimating means being mounted in said illuminator relative to said reflecting prism so as to receive light only in the upper halves of their respective focal planes so that upon collimation of the light in the first and second halves of the distribution image output beams are formed at each of said first and second exit pupils characterized by the absence of light in the space above a horizontal plane passing through the optical axes of said optical system; and,
 (g) means for imaging the first and second halves of the distribution image at respective ones of said first and second exit pupils so as to form a pair of generally horizontal beams of light parallel to one another and to a vertical plane passing through the apex of said prism and which overlap in the far field so as to define a composite illumination beam having a broad forward aspect and essentially devoid of light in the space above a horizontal plane passing through the generally parallel axes of said optical system.

36. A continuous duty low backscatter illuminator comprising, in combination:
 (a) an optical system having (i) a first entrance pupil, (ii) first and second exit pupils operatively associated with said first entrance pupil and disposed on generally parallel optical axes, (iii) a second entrance pupil and (iv), third and fourth exit pupils operatively associated with said second entrance pupil and disposed on generally parallel optical axes;
 (b) means for forming first and second collimated light beams of relatively high radiant intensity and for directing the first and second collimated beams thus formed through respective different ones of said first and second entrance pupils of said optical system;
 (c) first and second image splitting reflecting prisms mounted in said illuminator,
 (d) means for imaging the first distribution image formed by the first collimated light beam at said first entrance pupil at the apex of said first reflecting prism so as to split the first distribution image along a line bisecting the axis thereof to form first and second halves of the first distribution image which are respectively reflected in generally opposite directions by said first reflecting prism;
 (e) means for imaging the second distribution image formed by the second collimated light beam at said second entrance pupil at the apex of said second reflecting prism so as to split the second distribution image along a line bisecting the axis thereof to form first and second halves of the second distribution image which are respectively reflected in generally opposite directions by said second reflecting prism;
 (f) first and second means for collimating respective ones of the first and second halves of the first distribution image formed at the apex of said first reflecting prism and, third and fourth means for collimating respective ones of the first and second halves of the second distribution image formed at the apex of said second reflecting prism, said first and second collimating means being mounted in said illuminator relative to said first prism and said third and fourth collimating means being mounted in said illuminator relative to said second prism so as to receive light only in the upper halves of their respective focal planes so that upon collimation of the light in the first and second halves of each of the first and second distribution images output beams are formed at each of said first, second, third and fourth exit pupils characterized by the absence of light in the space above a horizontal plane pass through the optical axes of said optical system;
 (g) means for imaging the first and second halves of the first distribution image at respective ones of said first and second exit pupils so as to form a pair of generally parallel beams of light which overlap in the far field so as to define a first portion of an illumination beam; and,
 (h) means for imaging the first and second halves of the second distribution image at respective ones of said third and fourth exit pupils so as to form a pair of generally parallel beams of light which overlap in the far field so as to define a second portion of the illumination beam with the first and second portions defining an illumination beam having a broad forward aspect and essentially devoid of light in the space above a horizontal plane passing through the generally parallel optical axes of said optical system.

37. A continuous duty illuminator as set forth in claim 36 wherein first and second bimirrors are mounted in said illuminator in the path of the output beams from respective ones of said first and second collimating means, third and fourth bimirrors are mounted in said illuminator in the paths of the output beams from respective ones of said third and fourth collimating means, and wherein the centers of said first, second, third and fourth exit pupils of the optical system are coincident with the apexes of respective ones of said first, second, third and fourth bimirrors so that the collimated beam exiting from each of said first, second, third and fourth exit pupils is defined by a pair of beams having slightly diverging axes leaving the respective exit pupil.

38. A continuous duty illuminator as set forth in claim 37 wherein the eight beams exiting from said first, second, third and fourth exit pupils respectively overlap one another in the far field so as to form an illuminating beam having a broad forward aspect and essentially devoid of light in the space above a horizontal plane passing through the optical axes of said optical system.

39. A continuous duty illuminator as set forth in claim 38 wherein said first, second, third and fourth bimirrors are each mounted in said illuminator with freedom for controlled movement about vertical axes passing through their respective apexes so as to permit horizontal panning of the illuminating beam reflected therefrom while maintaining the optical axes of said optical system passing through said first, second, third and fourth exit pupils essentially parallel, and further including means for rotating said first, second, third and fourth bimirrors about the vertical axes passing through their respective apexes while maintaining the optical axes of said optical system essentially parallel.

* * * * *